United States Patent [19]

Borkowski et al.

[11] 4,235,859

[45] Nov. 25, 1980

[54] GRAPHITE MOLDING POWDER AND METHOD OF PREPARATION

[75] Inventors: John W. Borkowski, Ridgway; La Vern J. Lenze, Jr., St. Marys; Alan F. Campbell, St. Marys; William A. Nystrom, St. Marys, all of Pa.

[73] Assignee: Stackpole Carbon Company, St. Marys, Pa.

[21] Appl. No.: 27,034

[22] Filed: Apr. 4, 1979

[51] Int. Cl.$^3$ ............................................. C01B 31/04
[52] U.S. Cl. .................................. 423/448; 106/307; 423/445
[58] Field of Search ...................... 423/448, 445, 460; 106/307

[56] References Cited

U.S. PATENT DOCUMENTS

| 1,191,383 | 7/1916 | Aylsworth | 423/460 |
| 3,560,155 | 2/1971 | Olstowski et al. | 423/448 |
| 4,146,401 | 3/1979 | Yamada et al. | 423/448 X |

*Primary Examiner*—Edward J. Meros
*Attorney, Agent, or Firm*—Brown, Flick & Peckham

[57] ABSTRACT

Vermiform graphite is compressed to produce a preform with a density of about 0.03 to 0.8 g/cc, followed by comminuting the preform to produce a graphite molding powder that will have a typical mold fill-ratio between about 7 and 10 to 1 for making molded graphite parts with a density of at least 1.1 g/cc.

5 Claims, No Drawings

GRAPHITE MOLDING POWDER AND METHOD OF PREPARATION

There are many uses for molded graphite parts made from vermiform graphite without binders. Such parts can be made directly by compressing expanded or vermiform graphite in a mold, but the fill-ratio, which is the ratio of the height of the column of graphite before compressing to the height of the molded part after compressing, is on the order of 280 to 1. Tooling to produce parts this way is prohibitively costly and large in size.

An alternate way of molding the graphite parts is to first comminute graphite foil that has been made by compressing expanded graphite. Graphite foil has a density greater than 1.0 g/cc, usually about 1.1 g/cc. The resulting powder is then compressed in a mold to produce the desired part. In order to obtain a practical fill-ratio, the powder must be very fine, but molded parts made from such powder are considerably weaker than parts molded directly from expanded graphite.

It is among the objects of this invention to produce a molding compound which has a better fill-ratio than expanded graphite, which has a better fill-ratio than comminuted graphite foil, and which is capable of being molded into parts with higher strength than those molded from comminuted graphite foil.

In accordance with this invention, vermiform graphite is compressed with sufficient pressure to obtain a preform having a density from about 0.03 to 0.8 g/cc, but preferably from 0.06 to 0.1 g/cc. The fill-ratio for this pressing is approximately 12 to 1. The dimensions of the preform are not critical as long as the degree of compaction results in a density within the range just given. A typical preform, for example, can be $12'' \times 25'' \times \frac{1}{4}''$.

The preform, after being formed in the manner just described, is comminuted in any suitable manner to make a powder. This powder constitutes the new graphite molding compound. The comminuting is such that substantially all of the graphite particles will pass through a 48 mesh screen, and a maximum of about 60% of the particles will pass through a 100 mesh screen. The compound can be molded into the desired parts or objects by compressing it in molds without the necessity for using a binder. For example, no binder is required for molding ring-shaped parts having a typical density of 1.6 g/cc by using a molding pressure of 6.5 tons psi. Satisfactory parts with a density as low as 1.1 g/cc or with a density greater than 1.6 g/cc can also be molded from the compound without a binder.

An advantage of this method of making the molding compound is that if the preform and graphite foil are comminuted in the same equipment, separately of course, under identical conditions and for the same length of time, the fill-ratio of the new compound is about 7 to 1 when the powder has been made from a preform having a density of 0.03 g/cc, as compared to a ratio of about 13.8 to 1 when using a powder formed by comminuting graphite foil having a density of 1.1 g/cc. Furthermore, the crushing strength of the above-mentioned ring-shaped parts having a typical density of 1.6 g/cc is approximately 3.7 pounds for such parts made from the new compound, as compared to a strength of 3.0 pounds for like parts made from the comminuted foil.

When the graphite powder was obtained by comminuting for five minutes a preform having a density of 0.08 g/cc, the strength of the molded parts was 3.4 pounds and the fill-ratio was about 10 to 1 as opposed to a typical fill-ratio of about 13.8 to 1 for a molding compound made by comminuting for a much longer time graphite foil having a density of 1.1 g/cc. Although the fill-ratio using a molding compound made from comminuted foil might be improved by futher comminution of the foil to a still finer powder at additional cost, it is unlikely that a fill-ratio equivalent to that of this invention could ever be obtained. Also, parts molded from such powder would have even less strength, because the higher density comminuted foil particles lack the compactability and the mechanical bonding between the individual particles attainable with the compound made by this invention. Thus, this invention improves the manufacturing economics of molding strong graphite parts.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The method of making a binder-free graphite molding compound having a mold fill-ratio between about 7 and 10 to 1 suitable for making molded graphite parts having a density of at least 1.1 g/cc, comprising compressing vermiform graphite to produce a preform with a density of about 0.03 to 0.8 g/cc, and then comminuting said preform to produce a powdered molding compound in which substantially all of the particles are smaller than 48 mesh and at least 40% of the particles are greater in size than 100 mesh.

2. The method recited in claim 1, in which said compressing produces a preform density from 0.06 to 0.1 g/cc.

3. The method recited in claim 1, in which said compressing produces a preform density of 0.03 g/cc to produce a powder having a fill-ratio of about 7 to 1.

4. The method recited in claim 1, in which said compressing produces a preform density of 0.8 g/cc to produce a powder having a fill-ratio of about 10 to 1.

5. A graphite molding compound made by the method recited in any one of the above claims.

* * * * *